(12) United States Patent
Rose et al.

(10) Patent No.: US 10,526,894 B1
(45) Date of Patent: Jan. 7, 2020

(54) SHORT INLET WITH LOW SOLIDITY FAN EXIT GUIDE VANE ARRANGEMENTS

(71) Applicant: United Technologies Corporation, Farmington, CT (US)

(72) Inventors: Becky Rose, Colchester, CT (US); Frederick Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 631 days.

(21) Appl. No.: 15/256,309

(22) Filed: Sep. 2, 2016

(51) Int. Cl.
*F01D 5/14* (2006.01)
*F04D 29/54* (2006.01)
*F04D 29/32* (2006.01)
*F04D 29/38* (2006.01)
*F01D 9/04* (2006.01)

(52) U.S. Cl.
CPC .............. *F01D 5/141* (2013.01); *F01D 5/145* (2013.01); *F04D 29/324* (2013.01); *F04D 29/544* (2013.01); *F01D 9/041* (2013.01); *F04D 29/384* (2013.01); *F05D 2220/36* (2013.01); *F05D 2250/70* (2013.01)

(58) Field of Classification Search
CPC ........ F01D 5/141; F01D 5/145; F04D 29/544; F04D 29/324; F04D 29/384
See application file for complete search history.

(56) References Cited

U.S. PATENT DOCUMENTS

| 5,088,892 A | * | 2/1992 | Weingold | ............... | F01D 5/145 |
| | | | | | 415/193 |
| 6,312,219 B1 | * | 11/2001 | Wood | ..................... | F01D 5/005 |
| | | | | | 415/191 |
| 6,554,564 B1 | * | 4/2003 | Lord | ..................... | F01D 5/141 |
| | | | | | 415/119 |

(Continued)

FOREIGN PATENT DOCUMENTS

| EP | 1098092 | 5/2001 |
| EP | 1688586 | 8/2006 |

(Continued)

OTHER PUBLICATIONS

U.S. Appl. No. 14/804,728, filed Dec. 4, 2014, Seth Rodgers, Drew Scott, Tom Kreck.

(Continued)

*Primary Examiner* — Carlos A Rivera
*Assistant Examiner* — Behnoush Haghighian
(74) *Attorney, Agent, or Firm* — Snell & Wilmer, L.L.P.

(57) ABSTRACT

A propulsor for a gas turbine engine may comprise a case including a duct disposed along an axis to define a flow path, a rotor including a row of propulsor blades extending in a generally radial direction outwardly from a hub, the hub rotatable about the axis such that the propulsor blades deliver airflow into the flow path, and a row of guide vanes situated in the flow path. A first guide vane may comprise a radially inner length (LI), a radially outer length (LO), and a midspan length (LM). The first guide vane may have a first dimensional relationship defined as LO/LM. The first guide (Continued)

vane may have a second dimensional relationship defined as LI/LM. The first dimensional relationship and/or the second dimensional relationship may be greater than 1.05.

18 Claims, 6 Drawing Sheets

(56) References Cited

U.S. PATENT DOCUMENTS

| | | | | |
|---|---|---|---|---|
| 7,101,145 | B2* | 9/2006 | Tsuchiya | F01D 5/141 415/119 |
| 7,625,181 | B2* | 12/2009 | Matsuda | F01D 5/145 415/191 |
| 7,726,937 | B2* | 6/2010 | Baumann | F01D 5/06 415/191 |
| 7,797,944 | B2 | 9/2010 | Morford | |
| 8,047,802 | B2* | 11/2011 | Clemen | F01D 5/141 416/238 |
| 8,096,756 | B2* | 1/2012 | Vo | F01D 11/20 415/1 |
| 8,221,065 | B2* | 7/2012 | Greim | F01D 5/141 415/192 |
| 8,261,530 | B2 | 9/2012 | Hendricks | |
| 8,353,164 | B2 | 1/2013 | Morford | |
| 8,726,632 | B2 | 5/2014 | Morford | |
| 9,074,483 | B2* | 7/2015 | Breeze-Stringfellow | F01D 5/141 |
| 9,932,933 | B2* | 4/2018 | Lord | F02K 3/068 |
| 9,995,166 | B2* | 6/2018 | Vandeputte | F01D 9/045 |
| 10,024,172 | B2* | 7/2018 | Boeke | F01D 5/189 |
| 2015/0023791 | A1* | 1/2015 | Sadi | F04D 29/666 415/213.1 |
| 2015/0044028 | A1 | 2/2015 | Lord et al. | |
| 2015/0233250 | A1* | 8/2015 | Gallagher | F01D 5/141 60/805 |
| 2016/0108854 | A1* | 4/2016 | Lord | F02K 3/06 415/124.1 |

FOREIGN PATENT DOCUMENTS

| | | |
|---|---|---|
| EP | 3061910 | 8/2016 |
| WO | 20120125085 | 9/2012 |
| WO | 20140058478 | 4/2014 |
| WO | WO2015137685 | 9/2015 |

OTHER PUBLICATIONS

U.S. Appl. No. 14/882,760, filed Aug. 20, 2015, Lin Li, Chun Li, Yanbiao Zou.
U.S. Appl. No. 13/721,095, filed Mar. 3, 2016, Wesley K. Lord, et. al.
U.S. Appl. No. 14/974,169, filed Dec. 18, 2015, Michael Joseph Murphy.
U.S. Appl. No. 14/974,195, filed Dec. 18, 2015, Amr Ali.
U.S. Appl. No. 14/974,112, filed Dec. 18, 2015, Yuan Qiu.
U.S. Appl. No. 14/882,760, filed Oct. 14, 2015, Wesley Lord.
U.S. Appl. No. 15/009,868, filed Jan. 29, 2016, Matthew Bintz.
U.S. Appl. No. 13/721,095, filed Dec. 20, 2012, Wesley Lord.
U.S. Appl. No. 62/273,576, filed Dec. 31, 2015, Yuan Qiu.
U.S. Appl. No. 14/974,138, filed Dec. 18, 2015, Frederick Schwarz.
U.S. Appl. No. 14/804,728, filed Jul. 21, 2015, Frederick Schwarz.
European Patent Office, European Search Report dated Jan. 25, 2018 in Application 17184509.2-1006.

* cited by examiner

SHORT INLET WITH LOW SOLIDITY FAN EXIT GUIDE VANE ARRANGEMENTS

FIELD

This disclosure relates generally to a propulsor for gas turbine engines, and more particularly to a propulsor having a low solidity guide vane arrangement.

BACKGROUND

Gas turbine engines can include a propulsor, a compressor section, a combustor section and a turbine section. The propulsor includes fan blades for compressing a portion of incoming air to produce thrust and also for delivering a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor section and the propulsor.

Some propulsors include guide vanes positioned in a bypass flow path downstream of the fan blades. The guide vanes direct the bypass airflow from the fan blades before being ejected from the bypass flow path.

SUMMARY

A propulsor for a gas turbine engine may comprise a case including a duct disposed along an axis to define a flow path, a rotor including a row of propulsor blades extending in a generally radial direction outwardly from a hub, the hub rotatable about the axis such that the propulsor blades deliver airflow into the flow path, a row of guide vanes situated in the flow path, wherein a first guide vane extends in the generally radial direction between inner and outer surfaces of the duct, extends in a chordwise direction between a first leading edge and a first trailing edge to define a vane chord dimension (VCD) at a first span position of the first guide vane, and defines a vane circumferential pitch (VCP) at the first span position of the first guide vane and a second guide vane, wherein the first guide vane comprises a radially inner length (LI) and a radially outer length (LO) and a midspan length (LM), and wherein the first guide vane has a first dimensional relationship defined as LO/LM, the first dimensional relationship being greater than 1.05.

In various embodiments, the first guide vane may have a second dimensional relationship defined as LI/LM, the second dimensional relationship being greater than 1.20. The first dimensional relationship may be greater than 1.25. The second dimensional relationship may be greater than 1.30. The radially inner length (LI) may comprise a dimension between the first leading edge and the first trailing edge at a radially inner end of the first guide vane. The radially outer length (LO) may comprise a dimension between the first leading edge and the first trailing edge at a radially outer end of the first guide vane. The midspan length (LM) may comprise a dimension between the first leading edge and the first trailing edge at a midspan of the first guide vane. The row of guide vanes may have a vane solidity (VR) defined as VCD/VCP, the vane solidity (VR) being between 0.7 and 1.43 at a midspan of the row of guide vanes. The row of guide vanes may include a vane quantity (VQ) of guide vanes being between 14 and 40. Each of the propulsor blades in the row of propulsor blades may extend in the generally radial direction outwardly from a root to a tip, extend in the chordwise direction between a second leading edge and a second trailing edge to define a blade chord dimension (BCD) at the tip, and define a blade circumferential pitch (BCP) at the tip of the corresponding propulsor blade and an adjacent one of the propulsor blades. the row of propulsor blades may have a blade solidity (BR) defined as BCD/BCP, the blade solidity (BR) being between 0.6 and 1.0. The row of guide vanes may include a vane quantity (VQ) of guide vanes. The row of propulsor blades may include a blade quantity (BQ) of propulsor blades. A ratio of VQ/BQ may be between 2.1 and 2.5. The first span position may correspond to a midspan of the first guide vane. The row of propulsor blades may be configured to define a total pressure ratio across the propulsor blades alone of between 1.1 and 1.4, the pressure ratio being defined at a bucket cruise thrust specific fuel consumption (TSFC) at a flight condition of between 0.74 Mach and 0.83 Mach at between 33,000 ft and 38,000 ft.

A gas turbine engine may comprise an inlet section having a dimensional relationship defined as L/D, L being an axial length of an inlet portion of the gas turbine engine, and D being a fan diameter, the dimensional relationship being between about 0.2 and about 0.45, a turbine section configured to drive a compressor section, and a propulsor configured to be driven by the turbine section. The propulsor may comprise a bypass duct defining a bypass flow path, a rotor including a row of propulsor blades extending in a generally radial direction outwardly from a hub, the propulsor blades configured to deliver airflow into the bypass flow path, a row of guide vanes situated in the bypass flow path, wherein a first guide vane extends in the generally radial direction between inner and outer surfaces of the duct, extends in a chordwise direction between a first leading edge and a first trailing edge to define a vane chord dimension (VCD) at a first span position of the first guide vane, and defines a vane circumferential pitch (VCP) at the first span position of the first guide vane and a second guide vane, wherein the first guide vane comprises a radially inner length (LI) and a radially outer length (LO) and a midspan length (LM), and wherein the first guide vane has a dimensional relationship defined as LO/LM, LO/LM being greater than 1.05.

In various embodiments, the first guide vane may have a dimensional relationship defined as LI/LM, LI/LM being greater than 1.20. At least one of LO/LM and LI/LM may be greater than 1.25. The radially inner length (LI) may comprise a dimension between the first leading edge and the first trailing edge at a radially inner end of the first guide vane. The radially outer length (LO) may comprise a dimension between the first leading edge and the first trailing edge at a radially outer end of the first guide vane. The midspan length (LM) may comprise a dimension between the first leading edge and the first trailing edge at a midspan of the first guide vane. The row of guide vanes may have a vane solidity (VR) defined as VCD/VCP, the vane solidity (VR) being between 0.7 and 1.3. The first span position may correspond to a midspan of the first guide vane. Each of the propulsor blades may extend in the generally radial direction outwardly from a root to a tip, extend in the chordwise direction between a second leading edge and a second trailing edge to define a blade chord dimension (BCD) at the tip, and define a blade circumferential pitch (BCP) at the tip of the corresponding propulsor blade and an adjacent one of the propulsor blades. The row of propulsor blades may have a blade solidity (BR) defined as BCD/BCP, the blade solidity (BR) being equal to or less than 1. The row of guide vanes may include a vane quantity (VQ) of guide vanes. The row of propulsor blades may include a blade quantity (BQ) of propulsor blades. A ratio of VQ/BQ may be between 2.1 and 2.5.

A guide vane for a gas turbine engine may comprise an exterior vane surface extending in a generally radial direction between inner and outer surfaces of a duct, extending in a chordwise direction between a first leading edge and a first trailing edge to define a vane chord dimension (VCD) at a first span position of the guide vane, and defining a vane circumferential pitch (VCP) at the first span position of the guide vane and an adjacent guide vane, wherein the guide vane comprises a radially inner length (LI), a radially outer length (LO), and a midspan length (LM), wherein the guide vane has a first dimensional relationship defined as LO/LM, LO/LM being greater than 1.05, and wherein the guide vane has a second dimensional relationship defined as LI/LM, LI/LM being greater than 1.20.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Figure 1:
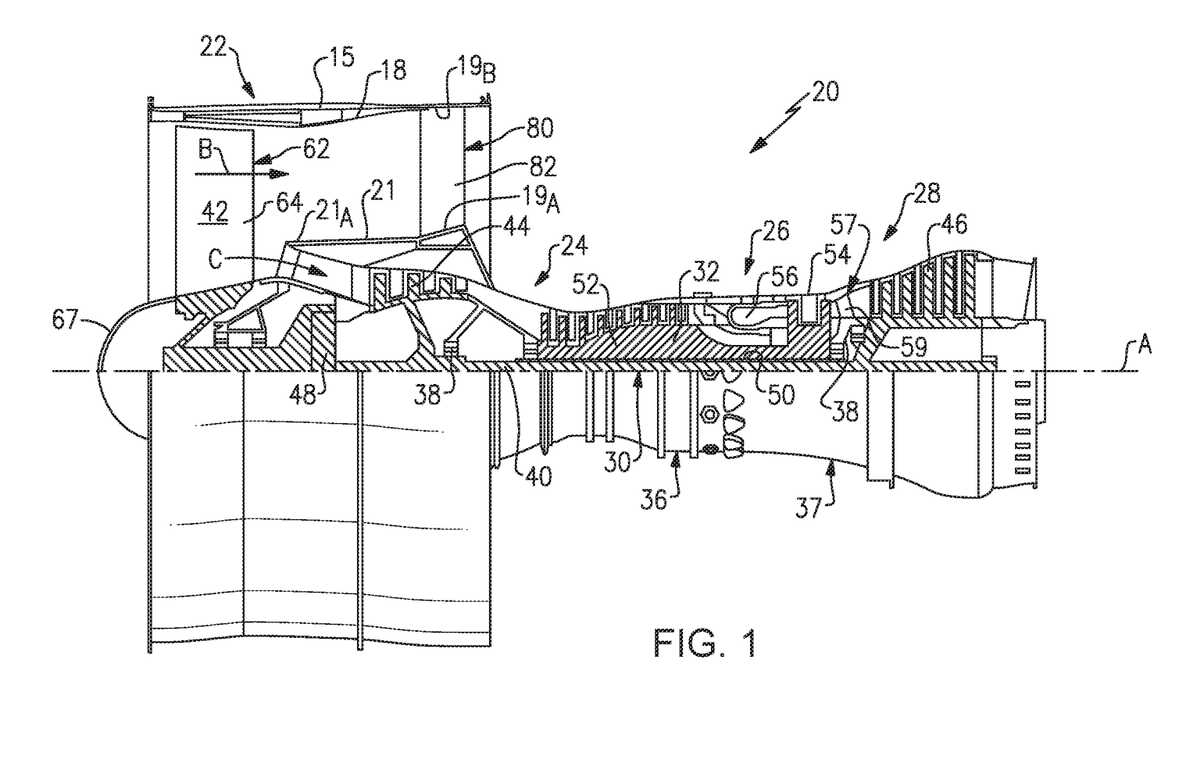
FIG. 1 illustrates a side cutaway view of a turbine engine, in accordance with various embodiments.

FIG. 1 schematically illustrates a gas turbine engine 20. The gas turbine engine 20 is disclosed herein as a two-spool turbofan that generally incorporates a propulsor or fan section 22, a compressor section 24, a combustor section 26 and a turbine section 28. Alternative engines might include an augmentor section (not shown) among other systems or features. The fan section 22 drives air along a bypass flow path B in a bypass duct 18 defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 may be a high-bypass geared aircraft engine, in accordance with various embodiments. In various embodiments, the engine 20 bypass ratio is greater than or equal to about six (6), and in various embodiments greater than about ten (10). The geared architecture 48 may be an epicyclic gear train, such as a star gear system, a planetary gear system or other gear system, with a gear reduction ratio of greater than or equal to about 2.3:1 and the low pressure turbine 46 may have a pressure ratio that is greater than about five. In various embodiments, the engine 20 bypass ratio may be greater than or equal to about ten (10:1). The fan diameter may be significantly larger than that of the low pressure compressor 44, and the low pressure turbine 46 may have a pressure ratio that is greater than about five 5:1. In various embodiments, the engine 20 bypass ratio may be greater than or equal to about twelve (12). The geared architecture 48 may have a gear reduction ratio of greater than about 2.6 and the low pressure turbine 46 may have a pressure ratio that is greater than about five. In various embodiments, the engine 20 bypass ratio may be less than or equal to about 40, or more narrowly less than or equal to about 30. Low pressure turbine 46 pressure ratio is pressure measured prior to inlet of low pressure turbine 46 as related to the pressure at the outlet of the low pressure turbine 46 prior to an exhaust nozzle. In various embodiments, the gear reduction ratio is less than about 5.0, or less than about 4.0, such as between about 2.4 and about 3.1. It should be understood, however, that the above parameters are only exemplary of various embodiments of a geared architecture engine and that the present disclosure is applicable to other gas turbine engines including direct drive or non-geared turbofans.

A significant amount of thrust is provided by the bypass flow B due to the high bypass ratio. The fan section 22 of the engine 20 is designed for a particular flight condition—typically cruise at about 0.8 Mach (~274 m/s) and about 35,000 feet (~10,668 m). The flight condition of 0.8 Mach and 35,000 ft (~10,668 m), with the engine at or near its best fuel consumption—also known as "bucket cruise Thrust Specific Fuel Consumption ('TSFC')"—is the industry standard parameter of pound-mass (lbm) of fuel being burned per hour-pound (h·lbf) of thrust the engine produces at that flight condition. "Low fan pressure ratio" is the pressure ratio across the fan blade alone, without a Fan Exit Guide Vane ("FEGV") system. The low fan pressure ratio as disclosed herein according to one non-limiting embodiment is less than or equal to about 1.50, and, in various embodiments, less than or equal to about 1.45. In various embodiments, the fan pressure ratio is between about 1.1 and about 1.4. For the purposes of this disclosure, the term "pressure ratio" means a ratio of the total pressures exiting the propulsor blades divided by the total pressure measured at the entering of the blade row at a bucket cruise condition. In various embodiments, a bucket cruise condition may be defined as the flight condition of 0.8 Mach (~274 m/s) at 35,000 ft (~10,668 m). In various embodiments, a bucket cruise condition may be defined as the flight condition of about 0.8 Mach (~274 m/s) at 35,000 ft (~10,668 m). For the purposes of this disclosure, the term "about" means ±3% unless otherwise indicated. In various embodiments, a bucket cruise condition may be defined as the flight condition of between 0.74 Mach (~253 m/s) and 0.83 Mach (~284 m/s) at between 33,000 ft (~10,058 m) to 38,000 ft (~11,582 m). "Low corrected fan tip speed" is the actual fan tip speed in ft/sec divided by an industry standard temperature correction of $[(Tram\ °R)/(518.7°\ R)]0.5$. The "Low corrected fan tip speed" as disclosed herein according to one non-limiting embodiment is less than about 1200 ft/second (~365 m/s), or, in various embodiments, less than about 1150 ft/second (~350 m/s).

Figure 2:
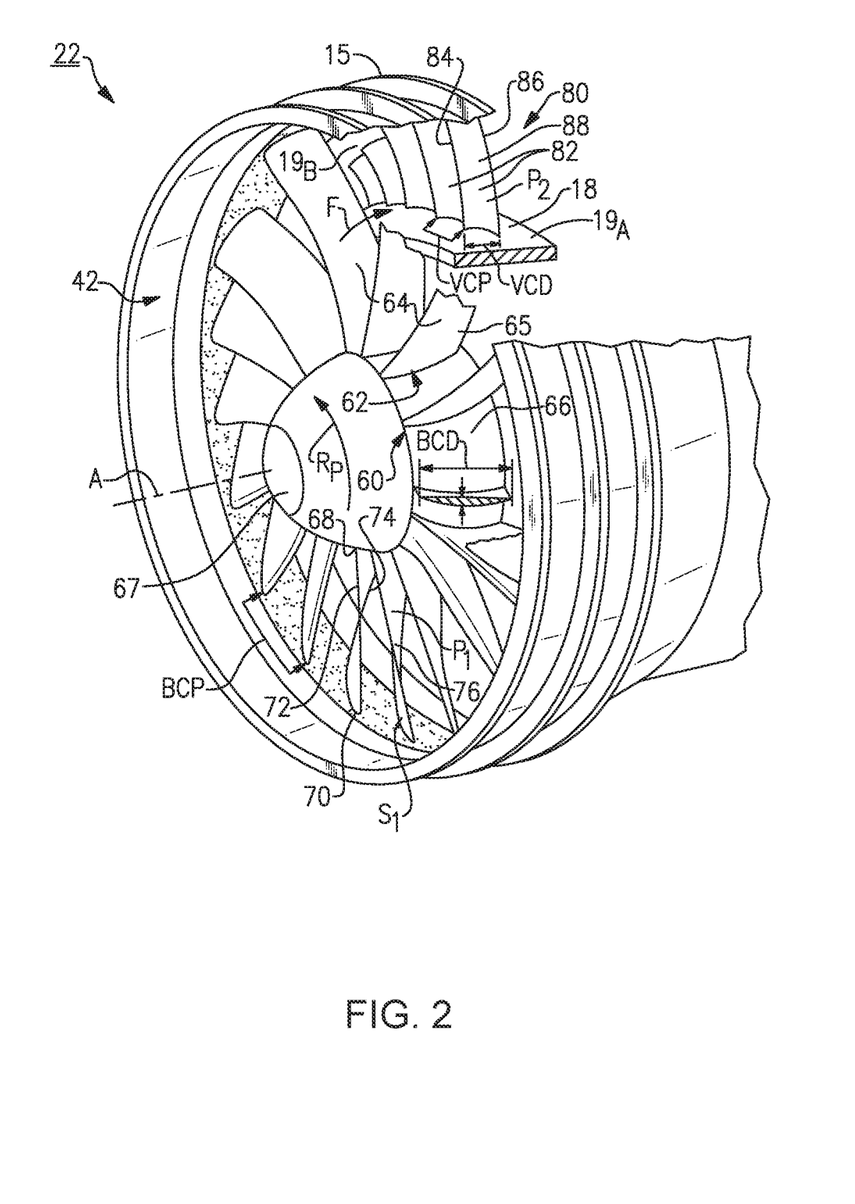
FIG. 2 illustrates a perspective view of a fan section, in accordance with various embodiments.

Referring to FIG. 2, a perspective view of the fan section 22 is shown. The fan 42 includes a rotor 60 having at least one row 62 of airfoils or propulsor blades 64 that are circumferentially distributed about, and are supported by, the hub 66. The hub 66 is rotatable about the engine axis A in a direction RP, which may be clockwise or counter-clockwise. A spinner 67 is supported relative to the hub 66 to provide an aerodynamic inner flow path into the fan section 22.

Figure 3A:
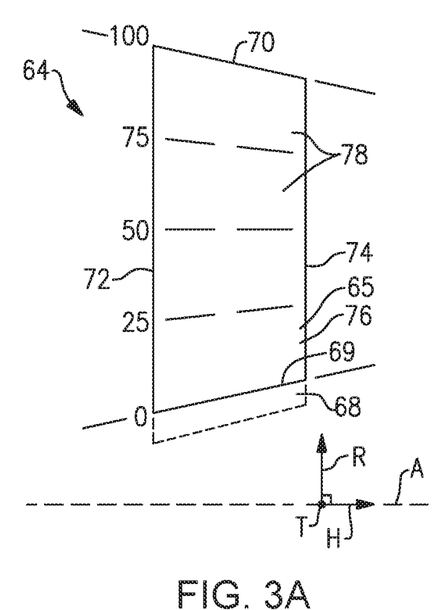
FIGS. 3A and 3B schematically illustrated span positions of a propulsor blade and a guide vane, respectively, in accordance with various embodiments.

With combined reference to FIG. 2 and FIG. 3A, each of the propulsor blades 64 includes an airfoil body 65 that extends in a generally spanwise or radial direction R from the hub 66 between a root 68, coupled to the hub 66, and a tip 70. Each airfoil body 65 extends axially in a chordwise direction H between a blade leading edge 72 and a blade trailing edge 74, and extends circumferentially in a thickness direction T between a first pressure side P1 and a first suction side S1. For the purposes of this disclosure, the term "generally radial direction" means a direction having a major component that extends generally from or toward an axis of rotation of the propulsor blades 64 and vanes 82, which in the illustrated example coincides with the engine central longitudinal axis A. It should be understood that the generally radial direction R can include a minor component in an axial and/or circumferential directions such that the propulsor blades 64 have a desired amount of sweep and/or lean, for example.

The airfoil body 65 of each propulsor blade 64 has an exterior blade surface 76 providing a contour that extends in the chordwise direction H between the blade leading edge 72 and the blade trailing edge 74. The exterior blade surface 76 generates lift based upon its geometry and directs flow along the core flow path C and bypass flow path B. The propulsor blade 64 may be constructed from a composite material, or an aluminum or titanium alloy, or a combination of one or more of these. Abrasion-resistant coatings or other protective coatings may be applied to the propulsor blade 64.

Figure 3B:
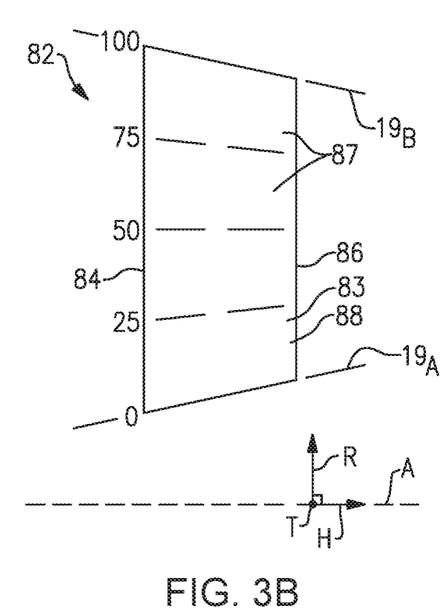

With combined reference to FIG. 2 and FIG. 3B, the fan section 22 includes at least one row 80 of turning or exit guide vanes 82. The guide vanes 82 are positioned in the bypass flow path B axially aft of the row 62 of propulsor blades 64 relative to the engine axis A. Each of the guide vanes 82 includes an airfoil body 83 that extends in the generally spanwise or radial direction R between inner and outer surfaces 19A, 19B of duct 18, axially in the chordwise direction H between a vane leading edge 84 and a vane trailing edge 86, and circumferentially in the thickness direction T between a second pressure side P2 and a second suction side S2. The chordwise direction H may be substantially parallel or transverse to the engine axis A. The generally radial direction R can be substantially perpendicular or transverse to the engine axis A. Inner surfaces 19A of the duct 18 can be provided by core engine case 21 at a location downstream of splitter 21A.

The airfoil body 83 of each guide vane 82 has an exterior vane surface 88 providing a contour that extends in the chordwise direction H between the vane leading edge 84 and the vane trailing edge 86. The exterior vane surface 88 can be contoured to direct flow F compressed by the propulsor blades 64 through the bypass flow path B. The guide vanes 82 can be constructed from a metal, metal alloy, or composite material, for example. The guide vanes 82 can serve as a structural component to transfer loads between the fan case 15 and the engine static structure 36. Although the fan section 22 of FIG. 2 is shown as a single propulsor stage having one row 62 of propulsor blades 64 and one row 80 of guide vanes 82, it should be appreciated that the fan section 22 can be configured to have more than one row of propulsor blades 64 and/or guide vanes 82 with one or more of the rows (e.g., first or last row) arranged to define any of the quantities disclosed herein.

With combined reference to FIG. 3A and FIG. 3B, span positions of propulsor blade 64 and guide vane 82, respectively, are schematically illustrated. Span positions are schematically illustrated from 0% to 100% in 25% increments, for example, to define a plurality of sections 78 of the propulsor blade 64 and a plurality of sections 87 of the guide vane 82. Each section 78, 87 at a given span position is provided by a conical cut that corresponds to the shape of segments of the bypass flow path B or the core flow path C, as shown by the large dashed lines.

In the case of a propulsor blade 64 with an integral platform, the 0% span position (or zero span) corresponds to the generally radially innermost location where airfoil body 65 meets the fillet joining the airfoil body 65 to the platform 69. In the case of a propulsor blade 64 without an integral platform, the 0% span position corresponds to the generally radially innermost location where the discrete platform 69 meets the exterior blade surface 76 of the airfoil body 65. A 100% span position (or full span) corresponds to section 78 of the propulsor blade 64 at the tip 70. The 50% position (or midspan) corresponds to a generally radial position halfway between the 0% and 100% span positions of the airfoil body 65.

With combined reference to FIG. 1, FIG. 3A, and FIG. 3B, the guide vane 82 has an airfoil body 83 which extends generally radially between inner and outer surfaces 19A, 19B of the duct 18. The 0% span position corresponds to the generally radially innermost location where the exterior vane surface 88 of the airfoil body 83 meets the inner surfaces 19A of the duct 18. The 100% span position corresponds to the generally radially outermost location where the exterior vane surface 88 of the airfoil body 83 meets the outer surfaces 19B of the duct 18. The 50% span position (or midspan) corresponds to a generally radial position halfway between the 0% and 100% span positions of the airfoil body 83. Airfoil geometric shapes, stacking offsets, chord profiles, stagger angles, axial sweep and dihedral angles, and/or tangential lean angles, bow, or other three-dimensional geometries, among other associated features, can be incorporated individually or collectively to the propulsor blades 64 and/or guide vanes 82 to improve characteristics such as aerodynamic efficiency, structural integrity, and vibration mitigation, for example.

Figure 4:
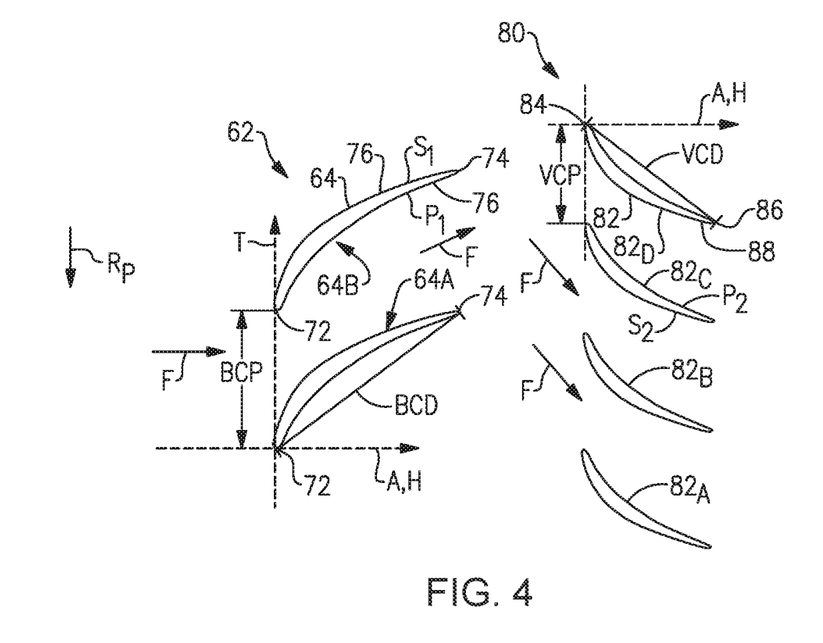
FIG. 4 illustrates an isolated view of a pair of adjacent propulsor blades of the fan section of FIG. 2 and four adjacent guide vanes of the fan section of FIG. 2, in accordance with various embodiments.

With reference to FIG. 4, an isolated view of a pair of adjacent propulsor blades 64 of the fan section 22 designated as blades 64A/64B, and four adjacent guide vanes 82 of the fan section 22 designated as guide vanes 82A/82B/82C/82D is illustrated, in accordance with various embodiments. Each blade 64A/64B is sectioned at a first generally radial position between the root 68 and the tip 70, and each vane 82A/82B/82C/82D is sectioned at a second generally radial position between inner and outer surfaces 19A/19B of the duct 18. The first and second generally radial positions may be the same (e.g., both at 25%, 50% or 100% span) or can differ (e.g., one at 50% and the other at 100% span).

A blade chord, represented by blade chord dimension (BCD), is a straight line that extends between the blade leading edge 72 and the blade trailing edge 74 of the propulsor blade 64. The blade chord dimension (BCD) may vary along the span of the propulsor blade 64. The row 62 of propulsor blades 64 defines a circumferential gap, represented as blade circumferential pitch (BCP), which is equivalent to an arc distance between the blade leading edges 72 of neighboring or adjacent propulsor blades 64 for a corresponding span position. In various embodiments, blade circumferential pitch (BCP) may be defined relative to another position along the exterior blade surface 76 of the propulsor blades 64, such as midchord or the blade trailing edges 74.

A vane chord, represented by vane chord dimension (VCD), is a straight line that extends between the vane leading edge 84 and the vane trailing edge 86 of the guide vane 82. The vane chord dimension (VCD) may vary along the span of the guide vane 82. The row 80 of guide vanes 82 defines a circumferential gap, represented as vane circumferential pitch (VCP), which is equivalent to an arc distance between the vane leading edges 84 of neighboring or adjacent guide vanes 82 for a corresponding span position. In various embodiments, vane circumferential pitch (VCP) is defined at another position along the exterior vane surface 88 of the guide vanes 82, such as midchord or the vane trailing edge 86.

Each of the blade circumferential pitch (BCP) and vane circumferential pitch (VCP) is a function of propulsor blade count and guide vane count, respectively. The row 62 of propulsor blades 64 includes a blade quantity (BQ) of propulsor blades, such as 20 or fewer propulsor blades, or more narrowly 16 or fewer propulsor blades. In various embodiments, the blade quantity (BQ) includes 10 or more blades, or more narrowly between 12 to 18 blades, or between 14 and 16 blades. The row 80 of guide vanes 82 includes a vane quantity (VQ) of guide vanes, such as 40 or fewer guide vanes. In various embodiments, the vane quantity (VQ) is 38 or fewer guide vanes, or more narrowly 20 or more guide vanes, such as between 32 and 38 guide vanes. In various embodiments, the vane quantity (VQ) is 30 or less guide vanes, such as between 20 and 24 guide vanes. In various embodiments, the ratio of VQ/BQ is at least about 2.4. In various embodiments, a ratio of VQ/BQ is between 2.0 and 2.6, or more narrowly between 2.1 and 2.5.

Each of the rows 62, 80 establishes a ratio of chord to gap, which is referred to as solidity. The row 62 of propulsor blades 64 has a blade solidity (BR) defined as BCD/BCP. In various embodiments, the blade solidity (BR) at tips 70 or full span is equal to or greater than about 0.6 and less than or equal to about 1.1. In various embodiments, the blade solidity (BR) at full span is equal to or greater than about 0.6, and is less than or equal to about 1. The blade solidity (BR) may be substantially the same at each span position, or may differ. In various embodiments, the blade solidity (BR) is taken at a different span position than full span, such as midspan, and can include any of the solidity values disclosed herein. In various embodiments, the blade solidity (BR) is an average solidity at each of the span positions, or an average of a subset of the span positions such as between the 25% and 75% span positions.

The row 80 of guide vanes 82 has a vane solidity (VR) defined as VCD/VCP. The vane solidity (VR) can be calculated throughout the span, and in various embodiments may be defined at the midspan or an average span of the guide vanes 82, for example. In various embodiments, the vane solidity (VR) at midspan of at least two, or each, of the guide vanes 82 is equal to or greater than about 0.7, or more narrowly equal to or greater than about 0.8, and is less than or equal to about 1.43. In various embodiments, the vane solidity (VR) is less than or equal to about 1.3, or more narrowly less than or equal to about 1.2. In various embodiments, the vane solidity (VR) at midspan is equal to or greater than about 0.85 or 0.9, more narrowly between about 1.1 and about 1.40, or even more narrowly between about 1.2 and about 1.3. The vane quantity (VQ) can be selected to establish a ratio of VQ/VR that is between about 14.0 and about 40.0, more narrowly less than about 38.0, or between 20.0 and 30.0, for example. The vane solidity (VR) may be substantially the same at each span position, or may differ. In various embodiments, the vane solidity (VR) is taken at a different span position, such as the 100% span position, and can include any of the solidity values disclosed herein. In various embodiments, the vane solidity (VR) is an average solidity at each of the span positions, or an average of a subset of the span positions such as between the 25% and 75% span positions.

In various embodiments, vane solidity (VR) varies in the generally radial direction R and includes any of the quantities disclosed herein. In various embodiments, the vane solidity (VR) at 0% span and/or 100% span is greater than 1.43, and can be less than 1.5. In various embodiments, the vane solidity (VR) at 0% span is between about 2.0 and about 3.3, the vane solidity (VR) at midspan is between about 1.14 and about 1.67, such as less than 1.43, and the vane solidity (VR) at 100% span is between about 0.8 and about 1.25.

The low solidity arrangement of the propulsor blades 64 and the guide vanes 82 reduces duct losses, increases aerodynamic performance and propulsive efficiency of the fan section 22, and reduces the weight of the engine 20, thereby reducing fuel consumption. In various embodiments including propulsor arrangements as set forth herein, provide very high efficiency operation, relatively high stall margins, and are compact and lightweight relative to their thrust capability. Two-spool and three-spool direct drive engine architectures can also benefit from the teachings herein.

Figure 5:
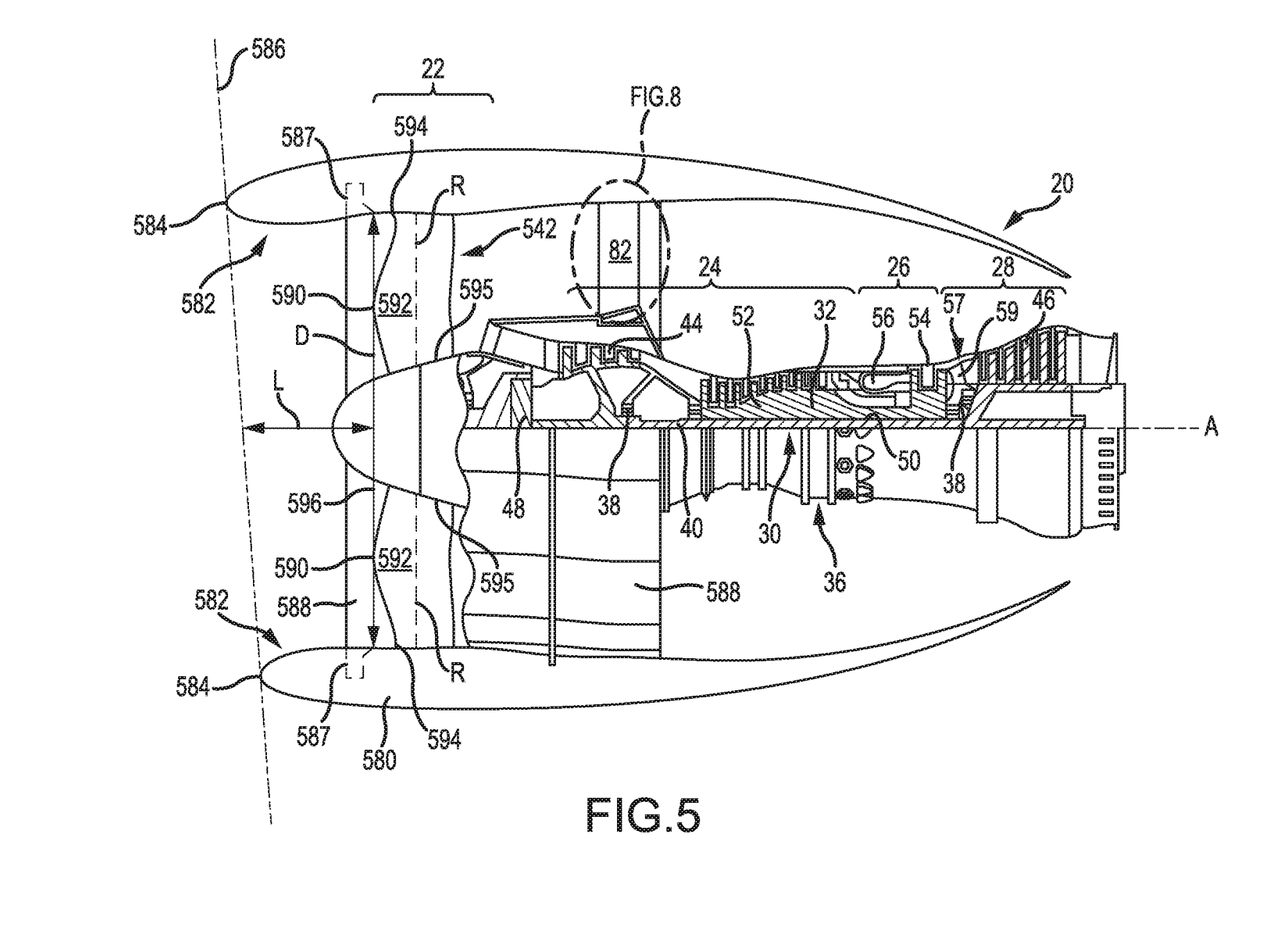
FIG. 5 illustrates a side cutaway view of a turbine engine housed within a nacelle, in accordance with various embodiments.

FIG. 5 illustrates engine 20 (see FIG. 1) with a nacelle or cowling 580, that surrounds the entire engine, in accordance with various embodiments. In this disclosure, like reference numerals designate like elements where appropriate. An inlet portion 582 is situated forward of the fan 542. In various embodiments, the inlet portion 582 may have a leading edge 584, which may be defined by the inlet side cut on the cowling 580. The leading edge 584 is generally within a first reference plane 586.

The nacelle 580 may include a flange 587 that is received against a leading edge on a fan case 588, in accordance with various embodiments. The inlet portion 582 has a length L between a selected location corresponding to the leading edge 584, such as a location within the reference plane 586, and a forward most portion 590 on leading edges on the fan blades 592 of the fan 542. In various embodiments, the length L may be considered an axial length of the inlet portion 582 because the length L is taken along a direction parallel to the central longitudinal axis A of the engine 20. In various embodiments, the inlet section of the nacelle 580 and the section of the fan case 588 that is forward of the blades 592 collectively establish the overall effective length L, as illustrated in FIG. 5. In other words, the length L of the inlet portion 582 may include the length of the inlet section of the nacelle 580 and some of the fan case 588.

Figure 6:
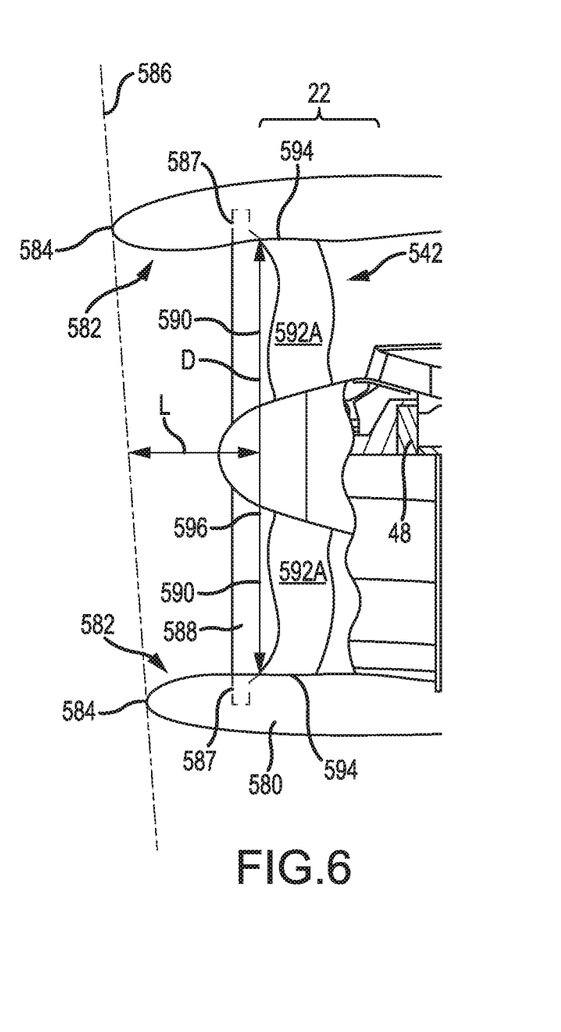
FIGS. 6 and 7 illustrate forward-swept fan blades and rearwardswept fan blades, respectively, in accordance with various embodiments.
Figure 7:
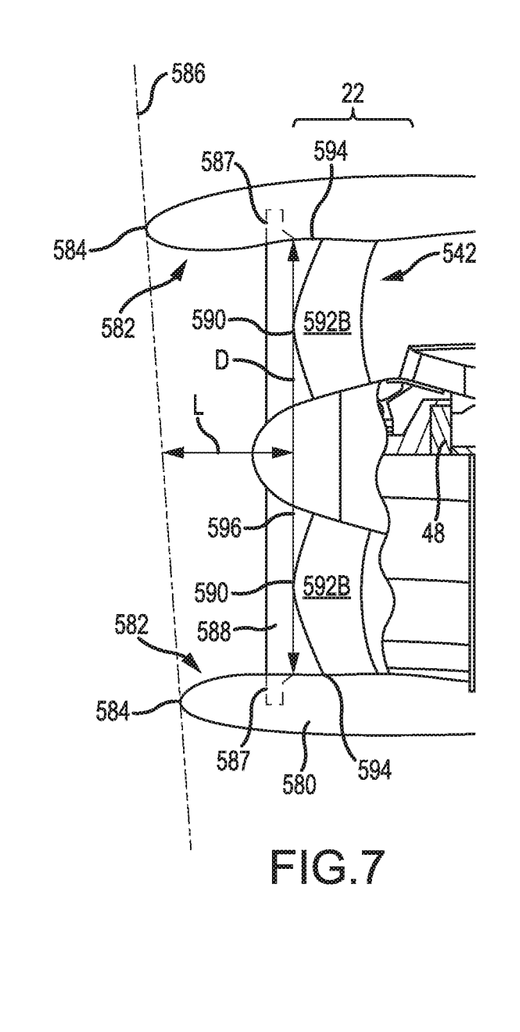

The fan blades may be unswept fan blades 42 (shown in FIG. 1) or swept fan blades 592 (shown in FIGS. 5-7). In various embodiments, the fan blades 592 are radial fan blades or three-dimensional swept fan blades (each having a similar side profile shown in FIG. 5). In various embodiments, the fan blades 592 are forward-swept fan blades 592A (shown in FIG. 6). In various embodiments, the fan blades 592 are rearwardswept fan blades 592B (shown in FIG. 7). In various embodiments, the fan blades 592 include both forward-swept and rearwardswept portions (shown in FIG. 5). A forward-swept fan blade is configured to have a radial portion of a leading edge of the fan blade forward of other portions of the leading edge. A rearward-swept fan blade is configured to have a radial portion of a leading edge of the fan blade rearward of other portions of the leading edge. A three-dimensional swept fan blade is twisted about an axis R extending in a radial direction between a tip or outermost edge 594 and a root 595 of the fan blade.

The fan blades 592 establish a diameter between circumferentially outermost edges 594. The fan diameter D is shown in FIG. 5 as a dimension extending between the outermost edges 594 of two of the fan blades 592 that are parallel to each other and extending in opposite directions away from the central axis A. In the illustration, the forward most portions 590 on the fan blades 592 are within a second reference plane 596. In various embodiments, the second reference plane 596 is oriented generally perpendicular to the central axis A of the engine 20, as illustrated in FIG. 5. In various embodiments, the first reference plane 586 may be oriented at an oblique angle relative to the second reference plane 596 and the central axis A, as illustrated in FIG. 5. As shown in FIG. 5, the oblique angle of orientation of the first reference plane 586 may be approximately 5°.

The length L is selected to establish a desired dimensional relationship between L and D. In various embodiments, the dimensional relationship of L/D (e.g., the ratio of L/D) may be between about 0.2 and about 0.45. In various embodiments, the dimensional relationship of L/D may be between about 0.25 and about 0.45. In various embodiments, L/D may be between about 0.30 and about 0.40. In various embodiments, the dimensional relationship of L/D may be about 0.35.

As can be appreciated from FIG. 5, the length L of the inlet portion 582 (i.e., the combined length of the nacelle inlet and the forward section of the fan case) is different at different locations along a perimeter of the nacelle 580. The leading edge 584 is further from the second reference plane 596 near the top (according to the drawing) of the engine assembly than it is near the bottom (according to the drawing) of the engine assembly. The greatest length L, as illustrated in FIG. 5, may correspond to a value for L/D that is no more than about 0.45. The smallest length L, as illustrated in FIG. 5, may correspond to a value for L/D that is at least about 0.20. The value of L/D may vary between those two limits at different locations on the leading edge 584.

In accordance with various embodiments where the leading edge 584 has a variable distance from the second reference plane 596, the dimensional relationship L/D is taken based upon a measurement of L that corresponds to an average measurement of the dimension between the leading edge 584 of the inlet portion 582 and the average location of the leading edge on the fan blades. Stated another way, L/D in such an embodiment is based on a measurement of the average distance between the reference planes 586 and 596. In accordance with various embodiments where the dimension between the first reference plane 586 and the second reference plane 596 varies, the dimension L used for the dimensional relationship L/D is taken at a midpoint between a portion of the leading edge 584 that is most forward and another portion of the leading edge 584 that is most aft.

In various embodiments, the dimension L may be measured between a first location where the central longitudinal axis A of the engine intersects the first reference plane 586 and a second location where the axis A intersects the second reference plane 596.

The dimensional relationship of L/D may be smaller than that found on typical gas turbine engines. Providing a shorter inlet portion length L facilitates reducing the weight of the engine assembly. A shorter inlet portion length also reduces the overall length of the nacelle and reduces external drag. Additionally, having a shorter inlet portion 582 reduces the bending moment and corresponding load on the engine structure during flight conditions, such as takeoff. A shorter inlet portion 582 also can contribute to providing more clearance with respect to cargo doors and other mechanical components in the vicinity of the engine.

The example engine 20 is a high bypass ratio engine having a larger fan with respect to the engine core components and lower exhaust stream velocities compared to engines with lower bypass ratios. Higher bypass ratio engines tend to have fan noise as a more significant source of noise compared to other sources. The illustrated example includes a shorter inlet yet does not have an associated effective perceived noise level that is noticeably greater than other configurations with longer inlets. One reason for this is that the example engine 20 includes a low pressure ratio fan that operates at a slower fan speed, which is associated with less fan noise. In various embodiments, the fan 542 has a pressure ratio between about 1.20 and about 1.50. A pressure ratio within that range corresponds to the engine operating at a cruise design point in various embodiments, and/or at sea level in various embodiments. The shorter length L of the inlet portion 582 combined with the low pressure ratio of the fan 542, which has a slower fan speed enabled by the geared architecture 48 of the engine 20, results in an acceptable perceived engine noise level. Additionally, the geared architecture 48 enables the fan 542 to rotate at a slower speed and a lower fan tip relative Mach number which is associated with a reduced fan noise signature. In some instances, the geared architecture 48 reduces the fan tip relative Mach number below 1.1 at the critical condition for noise attenuation, such as at full-takeoff, and in some instances, into the sub-sonic range at Mach 1.0 and below. Less acoustic liner material is necessary to maintain acceptable noise attenuation control because of the reduced fan source noise.

Figure 8:
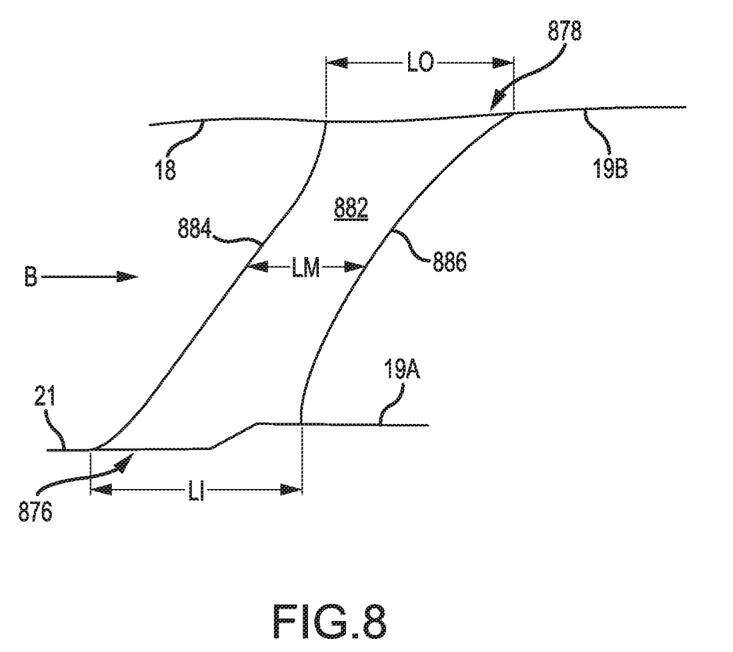
FIG. 8 illustrates a side view of a fan exit guide vane, in accordance with various embodiments.

With reference to FIG. 8, the guide vanes can be unswept guide vanes 82 (shown in FIG. 5) or swept guide vanes 882 (shown in FIG. 8). Guide vane 882 may comprise a generally hourglass shape. Guide vane 882 may comprise a first end (also referred to herein as a radially inner end) 876 and a second end (also referred to herein as a radially outer end) 878. In various embodiments, first end 876 may comprise a root of guide vane 882. In various embodiments, second end 878 may comprise a tip of guide vane 882.

Guide vane 882 may comprise a radially outer length LO. LO may be a distance between leading edge 884 and trailing edge 886 of guide vane 882, as measured at or in close proximity to second end 878. In various embodiments, LO may be measured between 90% and 100% span of guide vane 882. LO may comprise a linear distance. LO may be a projected dimension between leading edge 884 and trailing edge 886 when viewed from an angle perpendicular to the engine central longitudinal axis. Stated another way, LO may a projected linear distance between leading edge 884 and trailing edge 886 as measured in a direction which is parallel to engine central longitudinal axis A (see FIG. 1).

Similarly, guide vane 882 may comprise a radially inner length LI. LI may be a distance between leading edge 884 and trailing edge 886 of guide vane 882, as measured at or in close proximity to first end 876. In various embodiments, LI may be measured between 0% and 10% span of guide vane 882. LI may comprise a linear distance. LI may be a projected dimension between leading edge 884 and trailing edge 886 when viewed from an angle perpendicular to the engine central longitudinal axis. Stated another way, LI may a projected linear distance between leading edge 884 and trailing edge 886 as measured in a direction which is parallel to engine central longitudinal axis A (see FIG. 1).

Further, guide vane 882 may comprise a midspan length LM. LM may be a distance between leading edge 884 and trailing edge 886 of guide vane 882, as measured at or in close proximity to the midspan of guide vane 882. In various embodiments, the midspan may be measured between 40% and 60% span. Stated another way, between 40% and 60% of the distance between first end 876 and second end 878. LM may comprise a linear distance. LM may be a projected dimension between leading edge 884 and trailing edge 886 when viewed from an angle perpendicular to the engine central longitudinal axis. Stated another way, LM may a projected linear distance between leading edge 884 and trailing edge 886 as measured in a direction which is parallel to engine central longitudinal axis A (see FIG. 1).

In various embodiments, the dimensional relationship of LO/LM (e.g., the ratio of LO/LM) may be greater than 1.05. In various embodiments, the dimensional relationship of LO/LM may be greater than 1.25. In various embodiments, LO/LM may be between about 1.05 and about 3.0. In various embodiments, LO/LM may be between about 1.25 and about 3.0. In various embodiments, LO/LM may be between about 1.25 and about 2.0.

In various embodiments, the dimensional relationship of LI/LM (e.g., the ratio of LI/LM) may be greater than 1.20. In various embodiments, the dimensional relationship of LI/LM may be greater than 1.25. In various embodiments, the dimensional relationship of LI/LM may be between about 1.20 and about 3.0. In various embodiments, LI/LM may be between about 1.25 and about 3.0. In various embodiments, LI/LM may be between about 1.25 and about 2.0.

In various embodiments, tailoring LI and LO to be greater than LM may aid in handling distortions in the air flowing through bypass flow path B. In various embodiments, such distortions may generally be located in close proximity to outer surface 19B. In various embodiments, such distortions may generally be located in close proximity to inner surface 19A. Increasing the length between leading edge 884 and trailing edge 886 near inner and outer surfaces 19A, 19B of duct 18 may provide more surface area for guide vane 882 to turn the flow of air in bypass flow path B. This may aid in reducing distortions or turbulence of said air near inner and outer surfaces 19A, 19B. Furthermore, tailoring LM to be less than LI and LO may contribute to weight savings and may optimize performance.

In various embodiments, a row of guide vanes 882 may resist more than 10% of an input load during an FAA blade out test.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A propulsor for a gas turbine engine comprising:
   a case including a duct disposed along an axis to define a flow path;
   a rotor including a row of propulsor blades extending in a generally radial direction outwardly from a hub, the hub rotatable about the axis such that the propulsor blades deliver airflow into the flow path;
   a row of guide vanes situated in the flow path, the row of guide vanes comprises a first guide vane and a second guide vane;
   wherein the first guide vane extends in the generally radial direction between inner and outer surfaces of the duct, extends in a chordwise direction between a first leading edge and a first trailing edge to define a vane chord dimension (VCD) at a first span position of the first guide vane, and defines a vane circumferential pitch (VCP) at the first span position of the first guide vane and the second guide vane;
   wherein the first guide vane comprises a radially inner length (LI) and a radially outer length (LO) and a midspan length (LM); and
   wherein the first guide vane has a first dimensional relationship defined as LO/LM, the first dimensional relationship being greater than 1.05, and the first guide vane has a second dimensional relationship defined as LI/LM, the second dimensional relationship being greater than 1.20, and
   the first guide vane comprises a generally hourglass shape.

2. The propulsor of claim 1, wherein the first dimensional relationship is greater than 1.25.

3. The propulsor of claim 1, wherein the second dimensional relationship is greater than 1.30.

4. The propulsor of claim 1, wherein the radially inner length (LI) comprises a dimension between the first leading edge and the first trailing edge at a radially inner end of the first guide vane, the radially outer length (LO) comprises a dimension between the first leading edge and the first trailing edge at a radially outer end of the first guide vane, and the midspan length (LM) comprises a dimension between the first leading edge and the first trailing edge at a midspan of the first guide vane.

5. The propulsor of claim 1, wherein the row of guide vanes has a vane solidity (VR) defined as VCD/VCP, the vane solidity (VR) being between 0.7 and 1.43 at a midspan of the row of guide vanes.

6. The propulsor of claim 1, wherein the row of guide vanes includes a vane quantity (VQ) of guide vanes being between 14 and 40.

7. The propulsor of claim 1, wherein:
   each of the propulsor blades in the row of propulsor blades extends in the generally radial direction outwardly from a root to a tip, extends in the chordwise direction between a second leading edge and a second trailing edge to define a blade chord dimension (BCD) at the tip, and defines a blade circumferential pitch (BCP) at the tip of the corresponding propulsor blade and an adjacent one of the propulsor blades; and
   wherein the row of propulsor blades has a blade solidity (BR) defined as BCD/BCP, the blade solidity (BR) being between 0.6 and 1.0.

8. The propulsor of claim 7, wherein the row of guide vanes includes a vane quantity (VQ) of guide vanes, the row of propulsor blades includes a blade quantity (BQ) of propulsor blades, and a ratio of VQ/BQ is between 2.1 and 2.5.

9. The propulsor of claim 1, wherein the first span position corresponds to a midspan of the first guide vane.

10. The propulsor of claim 1, wherein the row of propulsor blades is configured to define a total pressure ratio across the propulsor blades alone of between 1.1 and 1.4, the pressure ratio being defined at a bucket cruise thrust specific fuel consumption (TSFC) at a flight condition of between 0.74 Mach and 0.83 Mach at between 33,000 ft and 38,000 ft.

11. A gas turbine engine comprising:
   an inlet section having a dimensional relationship L/D, L being an axial length of an inlet portion of the gas turbine engine, and D being a fan diameter, the dimensional relationship being between 0.2 and 0.45;
   a turbine section configured to drive a compressor section; and
   a propulsor configured to be driven by the turbine section, the propulsor comprising:
   a bypass duct defining a bypass flow path;
   a rotor including a row of propulsor blades extending in a generally radial direction outwardly from a hub, the propulsor blades configured to deliver airflow into the bypass flow path;

a row of guide vanes situated in the bypass flow path, the row of guide vanes comprises a first guide vane and a second guide vane;

wherein the first guide vane extends in the generally radial direction between inner and outer surfaces of the duct, extends in a chordwise direction between a first leading edge and a first trailing edge to define a vane chord dimension (VCD) at a first span position of the first guide vane, and defines a vane circumferential pitch (VCP) at the first span position of the first guide vane and the second guide vane;

wherein the first guide vane comprises a radially inner length (LI) and a radially outer length (LO) and a midspan length (LM); and wherein the first guide vane has a dimensional relationship defined as LO/LM, LO/LM being greater than 1.05, and the first guide vane has a second dimensional relationship defined as LI/LM, the second dimensional relationship being greater than 1.20, and the first guide vane comprises a generally hourglass shape.

12. The gas turbine engine of claim 11, wherein at least one of LO/LM and LI/LM is greater than 1.25.

13. The gas turbine engine of claim 11, wherein the radially inner length (LI) comprises a dimension between the first leading edge and the first trailing edge at a radially inner end of the first guide vane, the radially outer length (LO) comprises a dimension between the first leading edge and the first trailing edge at a radially outer end of the first guide vane, and the midspan length (LM) comprises a dimension between the first leading edge and the first trailing edge at a midspan of the first guide vane.

14. The gas turbine engine of claim 11, wherein the row of guide vanes has a vane solidity (VR) defined as VCD/VCP, the vane solidity (VR) being between 0.7 and 1.3.

15. The gas turbine engine as set forth in claim 11, wherein the first span position corresponds to a midspan of the first guide vane.

16. The gas turbine engine as set forth in claim 11, wherein:

each of the propulsor blades extends in the generally radial direction outwardly from a root to a tip, extends in the chordwise direction between a second leading edge and a second trailing edge to define a blade chord dimension (BCD) at the tip, and defines a blade circumferential pitch (BCP) at the tip of the corresponding propulsor blade and an adjacent one of the propulsor blades; and wherein the row of propulsor blades has a blade solidity (BR) defined as BCD/BCP, the blade solidity (BR) being equal to or less than 1.0.

17. The gas turbine engine as set forth in claim 16, wherein the row of guide vanes includes a vane quantity (VQ) of guide vanes, the row of propulsor blades includes a blade quantity (BQ) of propulsor blades, and a ratio of VQ/BQ is between 2.1 and 2.5.

18. A guide vane for a gas turbine engine comprising:

an exterior vane surface extending in a generally radial direction between inner and outer surfaces of a duct, extending in a chordwise direction between a first leading edge and a first trailing edge to define a vane chord dimension (VCD) at a first span position of the guide vane, and defining a vane circumferential pitch (VCP) at the first span position of the guide vane and an adjacent guide vane;

wherein the guide vane comprises a radially inner length (LI), a radially outer length (LO), and a midspan length (LM);

wherein the guide vane has a first dimensional relationship defined as LO/LM, LO/LM being greater than 1.05; and wherein the guide vane has a second dimensional relationship defined as LI/LM, LI/LM being greater than 1.20, and the guide vane comprises a generally hourglass shape.

* * * * *